(12) United States Patent
Sato et al.

(10) Patent No.: US 8,093,867 B2
(45) Date of Patent: Jan. 10, 2012

(54) CHARGING APPARATUS AND CHARGING METHOD (75) Inventors: Kazumi Sato, Miyagi (JP); Masatsugu Honma, Kanagawa (JP)

(73) Assignee: Sony Corporation, Tokyo (JP)

( * ) Notice: Subject to any disclaimer, the term of this patent is extended or adjusted under 35 U.S.C. 154(b) by 456 days.

(21) Appl. No.: 12/357,191

(22) Filed: Jan. 21, 2009

(65) Prior Publication Data
US 2009/0195215 A1 Aug. 6, 2009

(30) Foreign Application Priority Data
Feb. 6, 2008 (JP) ................................. 2008-025858

(51) Int. Cl.
*H02J 7/04* (2006.01)

(52) U.S. Cl. ...................................... 320/152; 320/150

(58) Field of Classification Search .................. 320/150, 320/152, 159
See application file for complete search history.

(56) References Cited

U.S. PATENT DOCUMENTS
6,118,255 A * 9/2000 Nagai et al. .................. 320/152

FOREIGN PATENT DOCUMENTS
| JP | 07-015885 | 1/1995 |
| JP | 11-308779 | 11/1999 |
| JP | 2004-015876 | 1/2004 |
| JP | 2006-288150 | 10/2006 |

* cited by examiner

*Primary Examiner* — Bot Ledynh
(74) *Attorney, Agent, or Firm* — K&L Gates LLP (57) ABSTRACT

A charging apparatus is provided and is configured to accept temperature information corresponding to a temperature of a secondary battery or a battery pack, supply a charging current to the secondary battery or the battery pack when the temperature is within a set charge temperature range, and interrupt the charging current when the temperature is beyond the set charge temperature range.

10 Claims, 10 Drawing Sheets

CHARGING APPARATUS AND CHARGING METHOD

CROSS REFERENCES TO RELATED APPLICATIONS

The present application claims priority to Japanese Patent Application JP 2008-025858 filed in the Japanese Patent Office on Feb. 6, 2008, the entire contents of which is being incorporated herein by reference.

BACKGROUND

In order to prevent an accident, it is important that a charging voltage does not exceed a rated voltage and a charging current does not exceed the maximum allowed current while charging a lithium ion secondary battery. It is necessary to manage both the charging voltage and the charging current, and constant-current constant-voltage charging system is employed. Commercially available charging apparatuses are configured to enable strict management of the charging voltage and the charging current. However, it is difficult to say that a sufficient safety measure is provided, only with strict management of the charging voltage and the charging voltage provides. Therefore, it is under consideration to detect a temperature within a battery pack and to perform charging only when the temperature is within a safe range.

For example, a temperature range of 0° C. to 45° C. is set as a chargeable temperature range (hereinafter referred to as a "charge temperature range"). When a lithium ion secondary battery is charged at a low temperature, lithium ions emitted from the positive electrode become poorly absorbed by the negative electrode, and a lithium metal become easily deposited. This might cause such an accident that the deposited lithium metal breaks through a separator. In addition, when charged at a high temperature, temperature rise due to the charging current is added to an environmental temperature, and the temperature of the battery rises. This might make it difficult to maintain the function of the separator, leading to an accident.

In related art charging apparatuses for charging a nickel hydrogen battery or a nickel cadmium battery at a constant current, charge completion time detection (so-called $\Delta T$ detection mode) is carried out by causing a temperature detecting element to detect a rapid increase in battery surface temperature per a certain period of time. For example, Japanese Unexamined Patent Application Publication No. Hei 7-15885 describes that a reference voltage value at a full charge is corrected depending on a temperature change rate, in order to solve a problem of incorrect charging under the influence of temperature in the $\Delta T$ detection mode.

The present application disclosed in the above publication is not intended to solve a problem of a case where the lithium ion secondary battery is charged beyond the charge temperature range. Unless attentions are paid to the heat generated by the battery and to the heat generated from the circuits of the charging apparatus, the battery temperature cannot be detected with high accuracy.

It is desirable to provide a charging apparatus and a charging method that can surely perform charging within the charge temperature range.

SUMMARY

The present disclosure relates to a charging apparatus and a charging method suitably applicable to, for example, a lithium ion secondary battery.

According to an embodiment, there is provided a charging apparatus configured to accept temperature information corresponding to a temperature of a secondary battery or a battery pack, and supply a charging current to the secondary battery or the battery pack when the temperature is within a set charge temperature range, and interrupt the charging current when the temperature is beyond the set charge temperature range.

Alternatively, the charge temperature range may be divided into a plurality of regions so as to judge which region of these divided regions the temperature belongs to.

Preferably, a charging current is turned on/off in a constant periodic cycle, and it is judged whether at least a temperature detected during a time the charging current is turned off is within the charge temperature range.

Preferably, charge control is performed by using a temperature detected in the on-period. In this case, if a difference between a first temperature detected during the time the charging current is turned on and a second temperature detected during the time the charging current is turned off is not more than a threshold, it is judged whether each of the first temperature and the second temperature is within the charge temperature range. If the difference between the first temperature and the second temperature is greater than the threshold, it is judged whether the second temperature is within the charge temperature range. In this case, the charge temperature range is preferably set independently with respect to the first and second temperatures.

In the charge control including constant current charge operation and constant voltage charge operation performed in the order indicated, as in a case of a lithium ion secondary battery, it is configured to judge whether the temperature is within the charge temperature range, only during the constant voltage charge operation.

According to an embodiment, there is also provided a charging method including the steps of accepting temperature information corresponding to a temperature of a secondary battery or a battery pack; supplying a charging current to the secondary battery or the battery pack when the temperature is within a set charge temperature range; and interrupting the charging current when the temperature is beyond the set charge temperature range.

Additional features and advantages are described herein, and will be apparent from the following Detailed Description and the figures.

DETAILED DESCRIPTION

A first embodiment will be described below with reference to FIG. 1. It is to be understood that the following embodiments are suitable specific examples of the present application on which various technically suitable limitations are imposed, and the scope of the present application is not limited to these embodiments unless otherwise noted in the following description.

A battery pack 1 and a charger 4 are connected to each other to charge a secondary battery (for example, a lithium ion secondary battery) BAT of the battery pack 1. The battery pack 1 and the charger 4 are connected to each other through positive and negative connecting terminals 1a (+) and 1b (−), 4a (+) and 4b (−), and control terminals 1c (T) and 4c (T). These control terminals 1c and 4c are used to supply the temperature information of the battery pack 1 to the charger 4, and distinguish the connection of the battery pack 1 to the charger 4. These connecting terminals are usually configured as mechanical contact terminals, and brought into connection with each other when the battery pack 1 is mounted on the charger 4.

The positive terminal 1a of the battery pack 1 is connected via a charge control switch 2a to a positive electrode of the secondary battery BAT, and a negative electrode of the secondary battery BAT is connected to the negative electrode 1b of the battery pack 1. The ON/OFF operation of the charge control switch 2a is controlled by a protection IC (integrated circuit) 2b. In a state in which the switch 2a is turned on, charge operation is performed by charging current, and the charging current is interrupted to stop charging by turning off the switch 2a.

Figure 1:
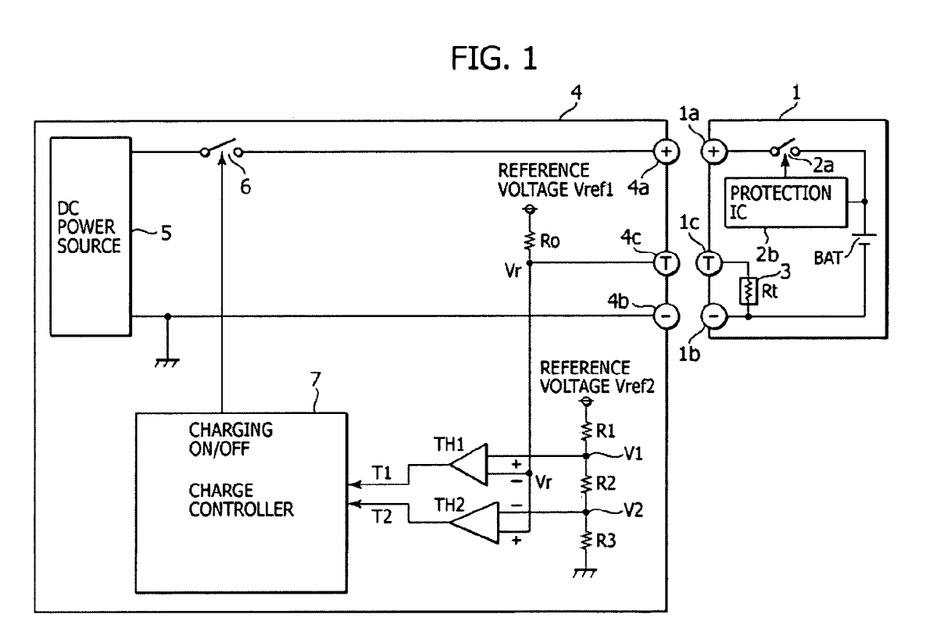
FIG. 1 is a block diagram of a first embodiment.

The configuration of the battery pack 1 in FIG. 1 is shown in a simplified form. A discharge control switch (not shown) is connected in series to the charge control switch 2a, and the ON/OFF operation of the discharge control switch is controlled by the protection IC 2b. The charge control switch 2a and the discharge control switch are formed by field effect transistors (hereinafter also referred to as FETs). A parasitic diode is disposed between a drain and a source of each of these FETs. It is configured to allow a current to flow through the parasitic diode.

The protection IC 2b functions to protect the secondary battery BAT from overcharge, overdischarge or overcurrent. In the protection operation, when the protection IC 2b detects an overcharge, the protection IC 2b generates a control signal to turn off the charge control switch 2a. Then, the charging current from the charger 4 is interrupted. This protection operation can avoid the overcharged state of the charger 4 due to failure thereof or the like.

In a case where a load is connected to the battery pack 1 instead of the charger 4 and the secondary battery BAT is brought into the overdischarge state, the secondary battery BAT might break down. The protection IC 2b detects that the battery voltage is not more than a certain voltage value (for example, 2.7V), and interrupts the discharge current by controlling the discharge control switch (not shown) in response to a discharge control signal. In the event of a short circuit between the positive and the negative terminals of the battery, an abnormal heat is possibly generated by a large current flow. When the discharge current exceeds a certain current value, the protection IC 2b interrupts the discharge current.

These protection functions are similar to those provided in related art battery packs. In the first embodiment, for example, a thermistor 3 is provided as a temperature detection element of the battery pack 1. One end of the thermistor 3 is connected to a control terminal 1c and the other end is connected to a connection terminal 1b. The thermistor 3 has the characteristic that the change of a resistance value Rt against temperature changes becomes negative. The thermistor 3 is disposed within the battery pack 1 or stuck to the surface of the outer case of the battery pack 1. Alternatively, a temperature detecting element may be included within the charger 4 so as to indirectly detect the temperature of the battery pack 1. Alternatively, an abnormal temperature environment may be detected by detecting the environmental temperature. As a temperature detecting element, an element whose resistance change against temperature changes has a positive slope, such as a PTC (positive temperature coefficient) thermistor may be used instead of the thermistor having the negative characteristic.

The charger 4 has a DC power source 5, a charge control switch 6 and a charge controller 7. The DC power source 5 generates a charging power source as an output, and the positive output terminal thereof is connected via the charge control switch 6 to a terminal 4a, and the negative output terminal thereof is connected to a terminal 4b. Specifically, the DC power source 5 can be in various forms, for example, a switching power source that converts a commercial power source of 100V to 240V to a DC power source, or a DC-DC convertor that generates a charging voltage, such as a 4.2V for charging a lithium ion battery, from a DC voltage source. As the charge control switch 6, an FET, a relay switch or the like is usable.

The charge controller 7 is formed with a microcomputer, and outputs a control signal for performing ON/OFF control of the charge control switch 6. The charger 4 performs charge control for suitably charging the secondary battery BAT within the battery pack 1. Although not shown, the secondary battery BAT, such as a lithium ion secondary battery, is charged by a method combining the constant-current charging and constant-voltage charging method. For example, when the battery voltage is not more than 4.1V, the constant current charging is performed by a predetermined charging current. When the battery voltage is greater than 4.1V, the charger 4 performs a constant voltage control operation so that the charging current is gradually decreased. The battery voltage increases toward the output voltage (4.2V) of the charger 4. Thereafter, the charging is completed upon detection of a fact that the difference voltage between the output voltage of the charger 4 and the battery voltage reaches a predetermined value, or the charging current becomes a predetermined value or less. This charge control is performed by the charge controller 7. In FIG. 1, the configuration for charge control is omitted.

To the charge controller 7, comparison outputs T1 and T2 are supplied from comparators TH1 and TH2, respectively. A reference voltage Vref2 (a fixed value) is supplied to one end of each of series circuits composed of resistors R1, R2 and R3. The other end of the series resistor circuits is grounded. A reference voltage V1 corresponding to a low temperature threshold in the charge temperature range is taken out from a connecting midpoint between the resistors R1 and R2, and the reference voltage V1 is supplied to one input terminal (the non-inverted input terminal) of the comparator TH1. A reference voltage V2 corresponding to the low temperature threshold in the charge temperature range is taken out from a connecting midpoint between the resistors R2 and R3, and the reference voltage V2 is supplied to the other input terminal (the inverted input terminal) of the comparator TH2.

Figure 3:
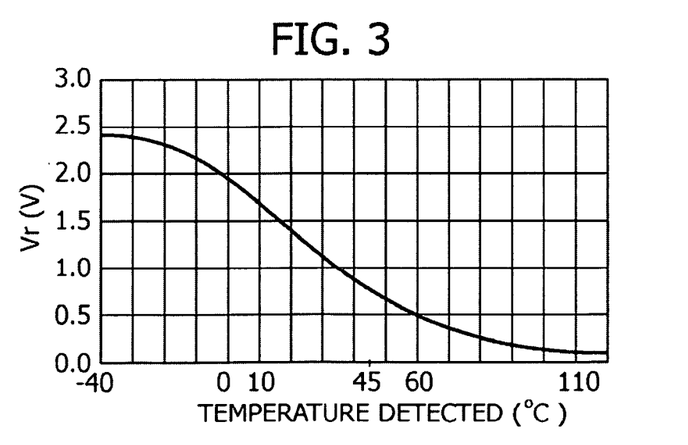
FIG. 3 is a graph showing an example of characteristics of a temperature detecting element used in the first embodiment.

A reference voltage Vref1 (a fixed value) is connected via a resistor Ro, a terminal 4c, a terminal 1c and the thermistor 3 to an earth line. The resistor Ro and the thermistor 3 are connected in series, and a voltage (hereinafter also referred to as a detection voltage) Vr at a connecting midpoint between the resistor Ro and the thermistor 3 is supplied to the other input terminal of the comparator TH1 and one input terminal of the comparator TH2, respectively. Therefore, the value of the detection voltage Vr is expressed by the following equation, and changes with a detected temperature as shown in FIG. 3, for example.

$$Vr = Vref1 \times (Rt/(Ro+Rt))$$

That is, because the thermistor 3 has the negative characteristic, the value of the detection voltage Vr (the resistance Rt) decreases as the temperature increases. It is set so that the reference voltage V1 corresponds to the low temperature threshold in the charge temperature range, for example, 0° C., and the reference voltage V2 corresponds to a high temperature threshold in the charge temperature range, for example, +45° C.

The comparator TH1 compares the reference voltage V1 and the detection voltage Vr. When Vr>V1, the comparison output signal T1 becomes a low level (hereinafter also referred to as "L"). When Vr≦V1, the comparison output signal T1 becomes a high level (hereinafter also referred to as "H"). The comparator TH2 compares the reference voltage V2 and the detection voltage Vr. When Vr≧V2, the comparison output signal T2 becomes H. When Vr<V2, the comparison output signal T2 becomes L.

Consequently, the comparators TH1 and TH2 function as a window comparator, and generate output signals having the following relationships.

$$\text{When } Vr > V1, T1 = L, T2 = H;$$

$$\text{When } V2 \leq Vr \leq V1, T1 = H, T2 = H; \text{ and}$$

$$\text{When } Vr < V2, T1 = H, T2 = L$$

The charge controller 7 receives the comparison output signals T1 and T2 of the comparators TH1 and TH2, respectively, and judges whether the temperature of the battery pack 1 is within the charge temperature range. If it is judged that the temperature of the battery pack 1 is within the charge temperature range, the charge controller 7 supplies the charge control switch 6 with a control signal to turn on the charge control switch 6. If it is judged that the temperature of the battery pack 1 is beyond the charge temperature range, the charge controller 7 supplies the charge control switch 6 with a control signal to turn off the charge control switch 6.

As an example, the low temperature threshold in the charge temperature range is set at 0° C., and the high temperature threshold is set at 45° C. It is further set so that Vref1=Vref2=2.5V, and Ro=100 kΩ. In this case, as an example, the individual elements values are set as follows.

The resistance value Rt of the thermistor 3:
357 kΩ at 0° C.
The detection voltage Vr:
2.5V/(100 k+357 k)×357 k=1.95V.
Accordingly, the V1 (corresponding to the low temperature threshold) is set at 1.95V.
The resistance value Rt of the thermistor 3:
41 kΩ at 45° C.
The detection voltage Vr:
2.5V/(100 k+41 k)×41 k=0.73V.
Accordingly, the V2 (corresponding to the high temperature threshold) is set at 0.73V.

The reference voltages V1 and V2 are expressed by calculation equations shown in Table 1. Based on the correlation diagram with the temperature-reference voltage Vr, the values of the resistors R1, R2 and R3 can be derived by the procedure shown in Table 2.

TABLE 1

|  | When battery is not mounted | When battery is mounted |
|---|---|---|
| Vr | =Vref1 | =Vref1/(Ro + Rt) × Rt |
| V1 | =Vref2(1 − R1/R) | Same as left |
| V2 | =Vref2(1 − (R1 + R2)/R) | Same as left |

TABLE 2

| Temperature Threshold (° C.) |  | Reference Voltage (V) |  | Resistance Constant (kΩ) |  |
|---|---|---|---|---|---|
| 0 | → | V1 | 1.950 | → | R1 | 3.9 |
| 45 |  | V2 | 0.730 |  | R2 | 9.1 |
|  |  | Vref2 | 2.5 |  | R3 | 4.7 |

*approximate values

The battery pack 1 is mounted on the charger 4 thus set. Assuming that the battery pack 1 at that time has a temperature of 15° C., the respective voltages have the following values.

The resistance value Rt of the thermistor 3:
163 kΩ at 15° C.
The detection voltage Vr:
2.5V/(100 k+163 k)×163 k=1.55V.
The inverted input of the comparator TH1 is 1.55V, and the non-inverted input thereof is 1.95V. Accordingly, the output T1 is H.
The non-inverted input of the comparator TH2 is 1.55V, and the inverted input thereof is 0.73V. Accordingly, the output T2 is H.

That is, from the relationship of 0.73V≦1.55V≦1.95V, the output signal T1 of the comparator TH1 is H, and the output signal T2 of the comparator TH2 is also H. Based on the result that the outputs T1 and T2 of these two comparators TH1 and TH2 are H, the charge controller 7 judges that the temperature is within the charge temperature range, and generates the control signal to turn on the charge control switch 6, so that a charging current is supplied through the charge control switch 6 to the battery pack 1. If the temperature deviates from the charge temperature range during charging operation, the output of one of these comparators becomes L, and the charge control switch 6 is turned off to discontinue the charging.

Figure 2:
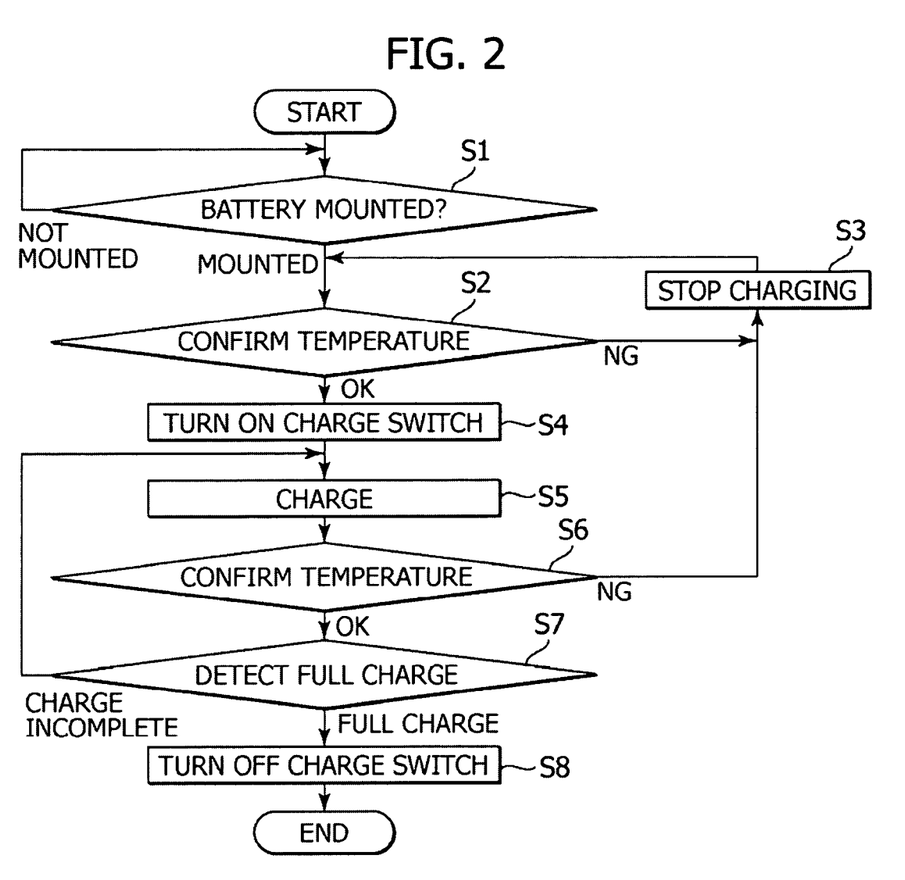
FIG. 2 is a flow chart showing a processing flow of the first embodiment.

The operation of the first embodiment will be described with reference to the flow chart of FIG. 2. The processing shown in the flow chart is executed under the control of the microcomputer included in the charge controller 7. In step S1, it is judged whether the battery pack 1 is mounted or not. In the state where the battery pack 1 is not mounted on the charger 4, the charge controller 7 brings the control switch 6 into the OFF state, and the charge circuit is in the open state. The voltage Vr to be inputted to the inverted input terminal of the comparator TH1 and to the non-inverted input terminal of the comparator TH2 is the reference voltage Vref1 connected through the resistor Ro.

Here, when the battery pack 1 is mounted on the charger 4, the reference voltage Vref1 is connected via the resistor Ro, the terminals 4c and 1c and the thermistor 3 within the battery pack 1 to the terminal 1b (ground). The detection voltage inputted to the inverted input terminal of the comparator TH1 and the non-inverted input terminal of the comparator TH2 becomes a voltage obtained by dividing the reference voltage Vref1 by the resistor Ro and the resistance value Rt of the thermistor 3. For example, assuming that the reference voltage Vref1 is 2.5V, the resistor Ro is 100 kΩ, and the Rt is 100 kΩ (at 25° C.), 2.5V is supplied to the input terminals of the comparators TH1 and the TH2 when the battery pack 1 is not mounted, and 2.5V/(100 k+100 k)×100 k=1.25V is supplied to the input terminals of the comparators TH1 and TH2, respectively.

The resistance value Rt of the thermistor 3 varies depending on the circumferential temperature. Therefore, the detection voltage value correlates with the temperature of the battery pack 1. By setting the reference voltage V1 supplied to the non-inverted input terminal of the comparator TH1 at a voltage value corresponding to the low temperature threshold, the output signal of the comparator TH1 becomes H when the detection voltage Vr is lower than the reference voltage V1, namely, when the thermistor circumferential temperature is higher than the low temperature threshold V1.

By setting the reference voltage V2 connected to the inverted input of the comparator TH2 at a voltage value corresponding to the high temperature threshold, the output signal of the comparator TH2 becomes H when the detection voltage Vr is higher than the reference voltage V2, namely, when the thermistor circumferential temperature is lower than the high temperature threshold. In step S2, it is confirmed that the temperature is within the charge temperature range, based on the fact that both the comparators TH1 and TH2 become an H signal.

In step S2, if it is judged that the detected temperature is beyond the charge temperature range, the procedure moves to step S3 to discontinue the charging by turning off the charge control switch 6. After step S3, the procedure returns to step S2 to perform temperature confirmation.

In step S2, if confirmed that the detected temperature is within the charge temperature range, namely, T1=T2=H, the procedure moves to step S4 to turn on the charge control switch 6. In step S5, charge operation is carried out.

Even during the charge operation, in step S6, it is monitored whether the temperature of the battery pack 1 is within the charge temperature range. If the temperature during the charging is beyond the charge temperature range, the comparison output of one of the comparators TH1 and TH2 becomes L, and the charge controller 7 stops charging by turning off the charge control switch 6 (step S3).

In step S6, if it is confirmed that the detected temperature of the battery pack 1 is within the charge temperature range, the charge operation is carried out, and the procedure then moves to step S7 to judge whether it has reached full charge. It is possible to detect whether it has reached full charge, based on the fact that the difference from the voltage of the secondary battery BAT is not more than a predetermined value, or alternatively based on the fact that the charging current is not more than a predetermined value.

If the full charge is detected in step S7, the procedure moves to step S8 to terminate the charge operation by turning off the charge control switch 6. Through the foregoing series of operations, the first embodiment can avoid charging when an abnormal heat generation occurs during charging, or under abnormal environmental temperatures.

It is generally considered that the upper and the lower limits of the charge temperature range are approximately 0° C. to 45° C., because the safe range varies depending on the characteristics of the secondary battery BAT. However, the present application is not limited to such a specific charge temperature range, but a safe range is to be set according to the characteristics of a secondary battery to be handled by the individual charger.

Figure 4:
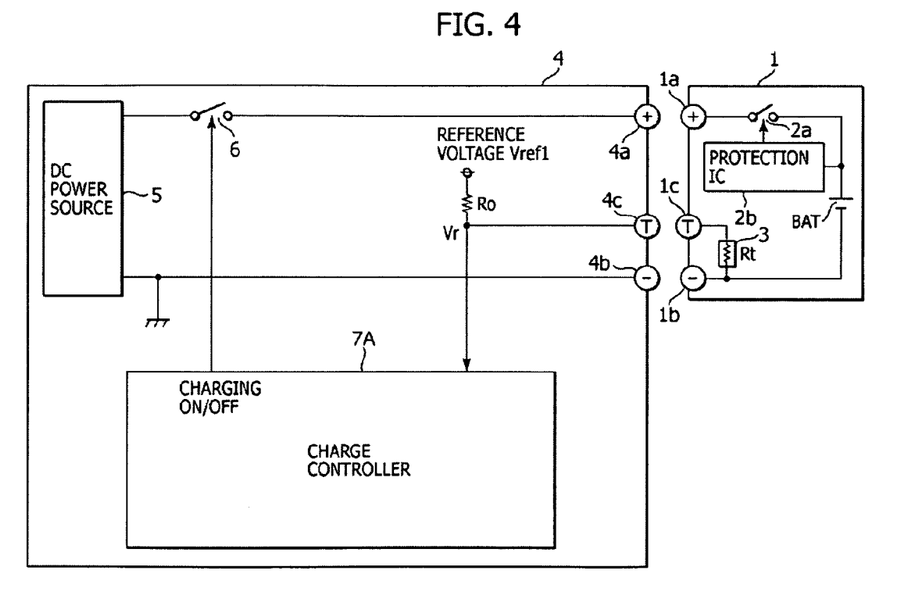
FIG. 4 is a block diagram of a second embodiment.

FIG. 4 shows the configuration of a second embodiment. This configuration is different from that of the first embodiment in the point that the detection voltage Vr is directly supplied to a charge controller 7A without passing through any comparator. The charge controller 7A has an A/D convertor that converts an analog detection voltage Vr to a digital signal, and is configured to judge whether the detection voltage Vr is within the set voltage range by software processing. Similarly to the first embodiment, when the detection voltage Vr is within the charge voltage range, the charger controller 7A generates a control signal to turn on the charge control switch 6.

Next, a third embodiment will be described. The third embodiment involves an improvement in accurately detecting the temperature of the battery pack 1. That is, the radiation heat from the charger 4 may be added to or the heat of the protection circuit within the battery pack may be added to a temperature detected during charging, making it difficult to accurately detect the temperature of the battery pack 1. Particularly, in the charger that supplies a relatively large charging current to the secondary battery BAT, the heat generation of the components of the protection IC within the battery pack and the circuit heat on the charger side are added to the self-heat generation of the secondary battery BAT. These exert a large influence and the temperature of the entire battery pack tends to increase easily.

For consideration of safety, the temperature of the secondary battery BAT is the most important and should be monitored, and it is desirable to detect an accurate temperature by minimizing the influence of the peripheral circuit heat. The third embodiment is configured to perform accurate temperature detection by turning on/off charging in certain cycles and performing temperature detection during the time the charging is turned off. When the charging is turned off, no current is supplied to the charger circuit and the battery protection circuit. This suppresses the temperature rise of the components, enabling to suppress radiation heat. The temperatures that the thermistor detects during this period are almost the temperatures of the secondary battery BAT (the battery cell) itself, thus enabling the safety of the secondary battery to be judged more accurately.

Figure 5:
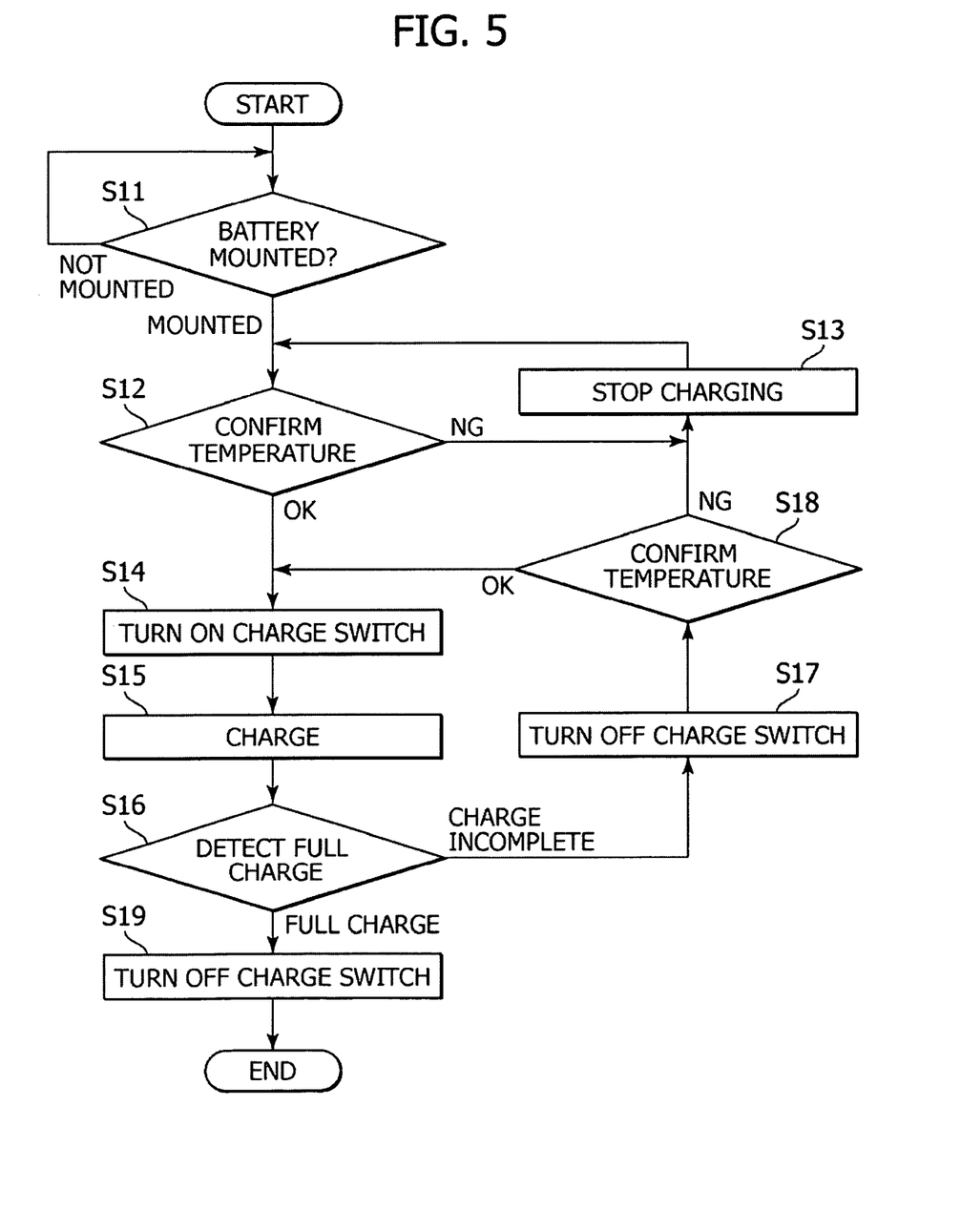
FIG. 5 is a flow chart showing a processing flow of a third embodiment

The processing of the third embodiment will be described below with reference to the flow chart of FIG. 5. The basic configurations of the battery pack 1 and the charger 4 are the same as those in FIG. 1 or 4. The processing shown in the flow chart of FIG. 5 is executed under the control of the microcomputer included in the charge controller 7 (or 7A).

In step S1, it is judged whether the battery pack 1 is mounted or not. In the state where the battery pack 1 is not mounted on the charger 4, the charge controller 7 brings the control switch 6 into the OFF state, and the charge circuit is in the open state. Here, when the battery pack 1 is mounted on the charger 4, the procedure moves to step S12 to judge whether the temperature of the battery pack 1 is within the charge temperature range. The temperature confirmation processing is carried out similarly to the foregoing first embodiment.

In step S12, if it is judged that the detected temperature is beyond the charge temperature range, the procedure moves to step S13 to stop charging (interrupt the charging current) by turning off the charge control switch 6. After step S13, the procedure returns to step S12 to perform temperature confirmation.

In step S12, if it is judged that the detected temperature is within the charge temperature range, the procedure moves to step S14 to turn on the charge control switch 6, and then to step S15 to perform charge operation.

In step S16, it is judged whether it has reached full charge. It is possible to detect that it has reached full charge when the difference between the output voltage of the charger 4 and the voltage of the secondary battery BAT is not more than a predetermined value, or when the charging current becomes a predetermined value or less.

If the detection result of step 16 is not full charge, the procedures moves to step S17 to cyclically turn off the charge control switch 6. That is, the charge switch 6 is turned off by the cycle of the temperature confirmation. For example, after the charge operation is continued for three minutes, the charge switch 6 is turned off for three seconds. The temperature confirmation in step S18 is performed in the off period of the charge switch 6.

If it is confirmed in step S18 that the temperature during charging is beyond the charge temperature range, the charge controller 7 stops charging by turning off the charge control switch 6 (step S13). If it is confirmed in step S18 that the temperature of the battery pack 1 is within the charge temperature range, the procedure returns to step S14 (the turning on of the charge switch 6) to resume the charge operation.

If the detection result of step S16 is the full charge, the procedure moves to step S19 to terminate the charge operation by turning off the charge control switch 6. Through the foregoing series of operations, the third embodiment can avoid charging when an abnormal heat generation occurs during charging, or under abnormal environmental temperatures. Additionally, since the temperature of the battery pack 1 when the charging current is turned off is detected, it is possible to reduce both the influence of the heat from the charger 4 and the influence of the heat of the protection circuit within the battery back 1, thereby enabling accurate temperature detection.

Next, a fourth embodiment to enable accurate temperature detection will be described. In the fourth embodiment, the temperature detection is performed not only the charge-off period but also the charge-on period. If the temperature difference between the on-period and the off-period is not more than a certain setting value, the temperature during the on-period is also used to judge whether the battery can be charged or not.

Figure 6:
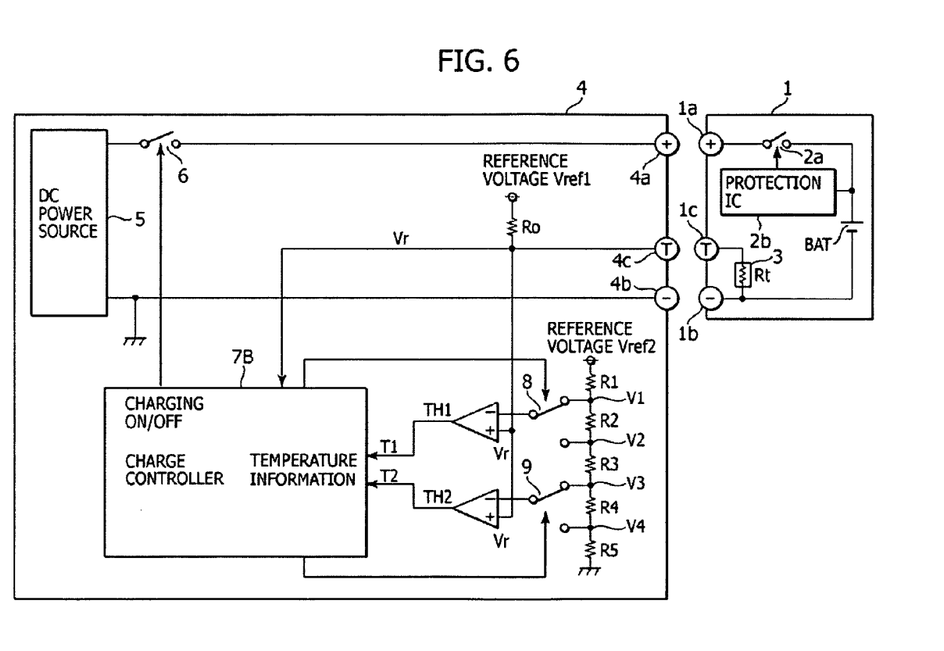
FIG. 6 is a block diagram of a fourth embodiment

As shown in FIG. 6, reference voltages compared with the detection voltage Vr, used in the on-period and used in the off-period, are switched by switches 8 and 9, respectively. These switches 8 and 9 are switched in response to a temperature setting control signal from a charge controller 7B.

The series circuits of resistors R1, R2, R3, R4 and R5 are interposed between a fixed reference voltage Vref2 and the ground so as to obtain connecting points among these resistors. A reference voltage V1 is taken out from the connecting point between the resistors R1 and R2, a reference voltage V2 is taken out from the connecting point between the resistors R2 and R3, a reference voltage V3 is taken out from the connecting point between the resistors R3 and R4, and a reference voltage V4 is taken out from the connecting point between the resistors R4 and R5. There is the following relationship: V4<V3<V2<V1.

The temperature of the battery pack 1 in the charge-on period is higher than the temperature of the battery pack 1 in the charge-off period. Therefore, the reference voltages V1 and V3 are set so as to define the low temperature threshold and the high temperature threshold in the charge-off period, respectively. The reference voltages V2 and V4 are set so as to define the low temperature threshold and the high temperature threshold in the charge-on period, respectively. Through the switches 8 and 9, during the charge-off period, the reference voltages V1 and V3 are supplied to the inverted input terminals of the comparators TH1 and TH2, respectively, and during the charge-on period, the reference voltages V2 and V4 are supplied to the inverted input terminals of the comparators TH1 and TH2, respectively.

Similarly to the first embodiment, the detection voltage Vr detected by the thermistor 3 of the battery pack 1 is supplied to the non-inverted input terminals of the comparators TH1 and TH2, respectively. When the detection voltage Vr is within the ranges of the reference voltage V1 and V3, the output signal T1 of the comparator TH1 becomes L, and the output signal T2 of the comparator TH2 becomes H. Similarly, when the detection voltage Vr is within the ranges of the reference voltage V2 and V4, the output signal T1 of the comparator TH1 becomes L, and the output signal T2 of the comparator TH2 becomes H.

The output signal T1 of the comparator TH1 and the output signal T2 of the comparator TH2 are supplied to the charge controller 7B. The charge controller 7B is capable of judging whether the temperature of the battery pack 1 is within the set charge temperature range, in each of the charge-on period and the charge-off period. The detection voltage Vr is also supplied to the charge controller 7B. The charge controller 7B detects a temperature Ton of the battery pack 1 in the charge-on period and a temperature Toff of the battery pack 1 in the charge-off period, and then judges the magnitude of the difference therebetween.

A small temperature difference between the on-period and the off-period means that relatively less heat is generated from the circuits and the components by applying the charge current. Hence, it can be estimated that there is less influence of the heat on the secondary battery BAT. In this case, even the temperature detected in the on-period can be used for temperature confirmation, because the temperature of the battery pack 1 is relatively accurately reflected thereon. By performing the temperature detections in both the on-period and the off-period, it is possible to detect any abnormal heat generation more quickly and to discontinue the charging.

Although the influence of radiation heat is small, it does not mean that there is no influence. Therefore, the individual temperature thresholds in the on-period and the off-period (the reference voltages V1 to V4) are set as above.

Figure 7:
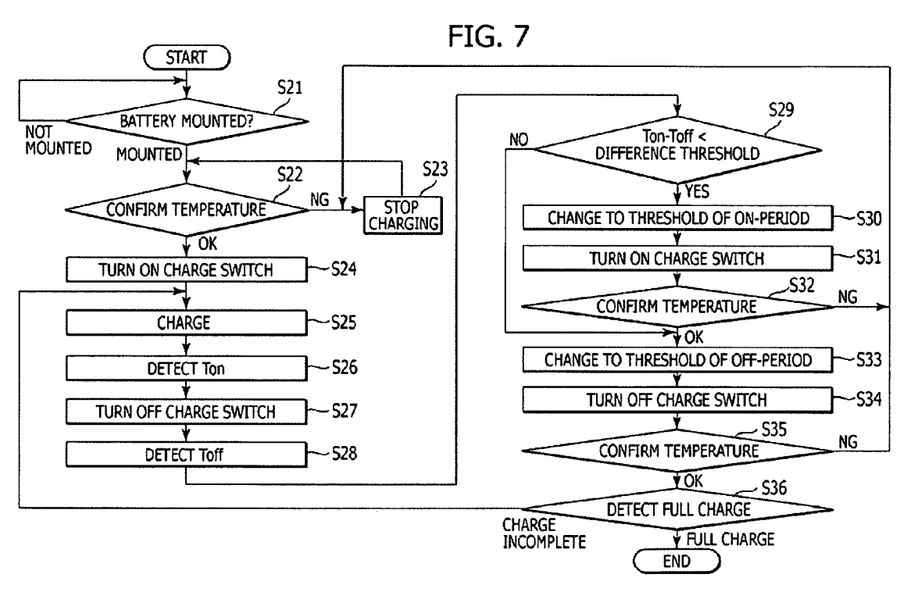
FIG. 7 is a flow chart showing a processing flow of the fourth embodiment.

The operation of the fourth embodiment will be described below with reference to the flow chart of FIG. 7. In step S21; it is judged whether the battery pack 1 is mounted or not. In the state where the battery pack 1 is not mounted on the charger 4, the charge controller 7B brings the control switch 6 into the OFF state, and the charge circuit is in the open state. Here, when the battery pack 1 is mounted on the charger 4, the procedure moves to step S22 to judge whether the temperature of the battery pack 1 is within the charge temperature range. This temperature confirmation processing uses the temperature threshold in the charge-off period (the reference voltages V1 and V3).

If it is judged in step S22 that the detected temperature is beyond the charge temperature range, the procedure moves to step S23 to stop charging by turning off the charge control switch 6. After step S23, the procedure returns to step S22 to perform temperature confirmation.

If it is judged in step S22 that the detected temperature is within the charge temperature range, the procedure moves to step S24 to turn on the charge control switch 6, and then to step S25 to perform charge operation.

The temperature detection operation is performed in each period of during the time the charge switch 6 is turned on and during the time the charge switch 6 is turned off. The temperature detection operation is performed under a constant cycle. When the temperature detection operation is performed, the succeeding processing is carried out depending on the detected temperature. In step S26, a temperature Ton in the charge-on period is detected from the detection voltage Vr. The detected temperature Ton is stored in the charge controller 7B. In step S27, the charge switch 6 is turned off. In step S28, a temperature Toff in the charge-off period is detected from the detection voltage Vr. The detected temperature Toff is stored in the charge controller 7B.

In step S29, it is judged whether a temperature difference (Ton−Toff) is smaller than a temperature difference threshold. If it is judged that the temperature difference is smaller than the threshold, the procedure moves to step S30 to set the temperature threshold at the value in the charge-on period (the reference voltages V2 and V4). In step S31, the charge switch 6 is turned on.

In step S32, it is judged whether the temperature of the battery pack 1 is within the charge temperature range by using the temperature threshold in the charge-on period (temperature confirmation processing). If it is confirmed in step S32 that the temperature of the battery pack 1 is within the charge temperature range, the procedure moves to step S33 to set the temperature threshold at the value in the charge-off period (the reference voltages V1 and V3). In step S34, the charge switch 6 is turned off. In step S35, it is judged whether the temperature of the battery pack 1 is within the charge temperature range by using the temperature threshold in the charge-off period (temperature confirmation processing).

If it is judged in step S29 that the temperature difference (Ton−Toff) is not less than the temperature difference threshold, the temperature confirmation processing using the temperature threshold in the charge-on period (step S32) is omitted, followed by the temperature confirmation processing using the temperature threshold in the charge-off period in steps S33, S34 and S35. In the temperature confirmation processing in steps S32 and S35, if it is judged that the detected temperature of the battery pack 1 is beyond the charge temperature range, the procedure moves to step S23 to stop charging.

In step S36, it is judged whether the battery has reached full charge. It is possible to detect full charge, based on the fact that the difference between the output voltage of the charger 4 and the voltage of the secondary battery BAT is not more than a predetermined value, or alternatively based on the fact that the charging current becomes the predetermined value or less.

If the detection result of step 36 is not full charge, the procedure returns to step S25 to repeat a series of processing from the above-mentioned step S26 to step S35. If the detection result of step S36 is full charge, the charge control switch 6 is turned off to terminate the charge operation. Through the foregoing series of operations, the fourth embodiment performs the temperature confirmation by using the temperature in the on-period of charging current in addition to the temperature in the off-period of charging current. This enables reductions in both the influence of the heat from the charger 4 and the influence of the heat of the protection circuit within the battery back 1, thus enabling accurate temperature detection and, further, continuous temperature confirmation.

Next, a fifth embodiment will be described below. The fifth embodiment is configured to eliminate insufficient charging by more finely dividing the temperature threshold so as to finely change the charging conditions with respect to the temperature of the battery pack 1. This becomes possible by increasing the number of comparators as needed, as shown in FIG. 8.

Figure 8:
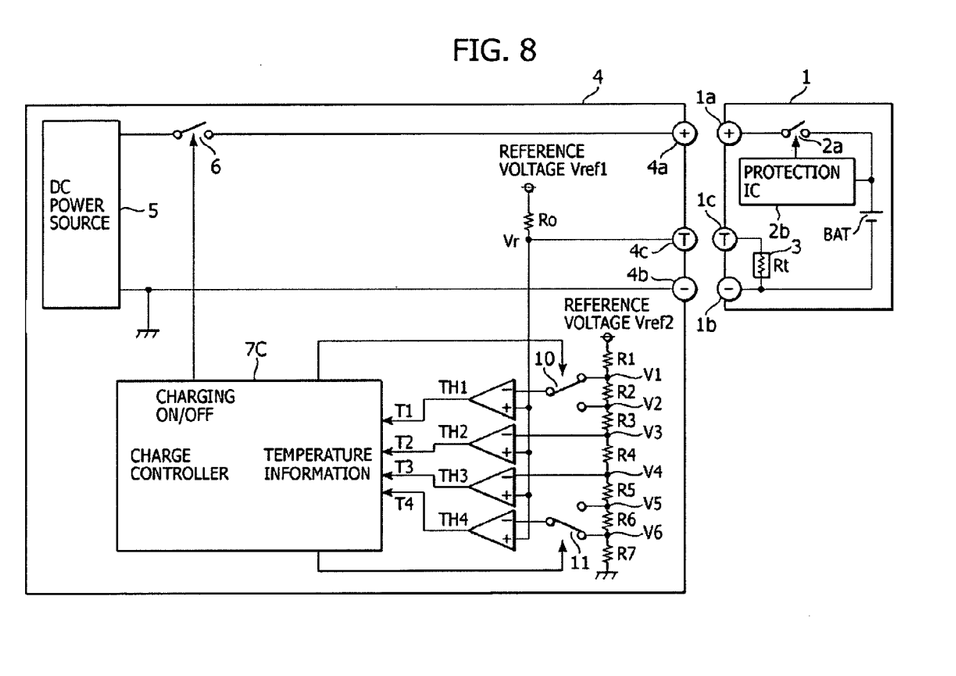
FIG. 8 is a block diagram of a fifth embodiment

As shown in FIG. 8, the series circuits of resistors R1, R2, R3, R4, R5, R6 and R7 are provided to generate reference voltages V1, V2, V3, V4, V5 and V6 corresponding to the temperature threshold. Comparators TH1, TH2, TH3 and TH4 are provided to supply their respective comparison outputs T1, T2, T3 and T4 to a charge controller 7C. A detection voltage Vr is supplied to the non-inverted input terminals of the comparators TH1 to TH4, respectively. One of the reference voltages V1 and V2 selected by a switch 10 is supplied to the non-inverted input terminal of the comparator TH1, and one of the reference voltages V5 and V6 selected by a switch 11 is supplied to the non-inverted input terminal of the comparator TH4.

The reference voltages V1 and V2 correspond to the low temperature threshold in the charge temperature range, and the reference voltages V5 and V6 correspond to the high temperature threshold in the charge temperature range. The charge temperature range is divided into three regions by the reference voltages V3 and V4. Consequently, based on the output signals T1 to T4 of the comparators TH1 to TH4, the charge controller 7C can judge which region among these divided regions in the charge temperature range the detected temperature of the battery pack 1 (the detection voltage Vr) belongs to. The charge temperature range can be set in accordance with the type, the specification and the like of the secondary battery BAT of the battery pack 1, by switching the upper limit or the lower limit temperature threshold through the switches 10 and 11.

Figure 9:
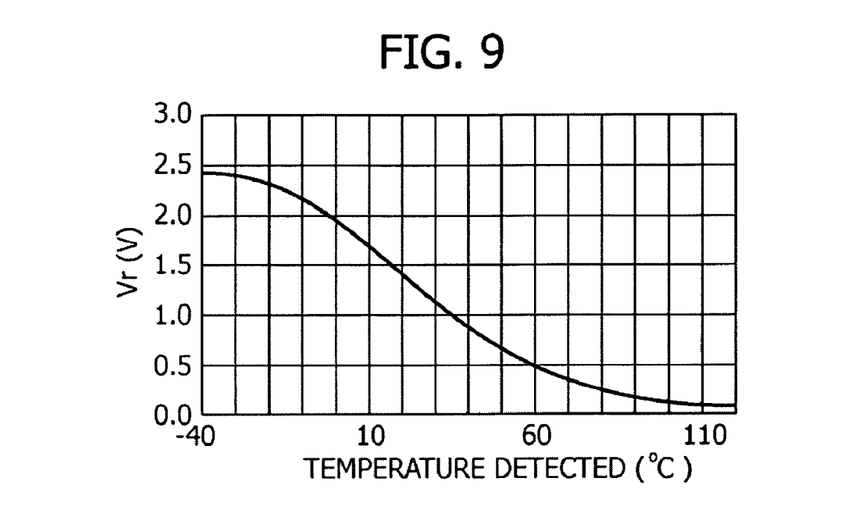
FIG. 9 is a graph showing an example of the characteristics of a temperature detecting element used in the fifth embodiment.

In the case of using the thermistor 3 having temperature characteristics as shown in FIG. 9, the calculation formulas of the individual voltages V1 to V6 are shown in Table 3, and the resistors R1 to R7 corresponding to the temperature threshold and the total values of these resistors are shown in Table 4.

TABLE 3

| | When battery is not mounted | When battery is mounted |
|---|---|---|
| Vr | =Vref1 | =Vref1/(Ro + Rt) × Rt |
| V1 | =Vref2(1 − R1/R) | Same as left |
| V2 | =Vref2(1 − (R1 + R2)/R) | Same as left |
| V3 | =Vref2(1 − (R1 + R2 + R3)/R) | Same as left |
| V4 | =Vref2(1 − (R1 + R2 + R3 + R4)/R) | Same as left |
| V5 | =Vref2(1 − (R1 + R2 + R3 + R4 + R5)/R) | Same as left |
| V6 | =Vref2(1 − (R1 + R2 + R3 + R4 + R5 + R6)/R) | Same as left |

*R =R1 + R2 + R3 + R4 + R5 + R6 + R7

TABLE 4

| Temperature Threshold Value (° C.) | | Reference Voltage (V) | | Resistance Constant (kΩ) | |
|---|---|---|---|---|---|
| −5 | → | V1 | 2.051 | → | R1 | 33 |
| 0 | | V2 | 1.940 | | R2 | 8.2 |
| 15 | | V3 | 1.573 | | R3 | 27 |
| 45 | | V4 | 0.648 | | R4 | 68 |
| 50 | | V5 | 0.585 | | R5 | 4.7 |
| 60 | | V6 | 0.449 | | R6 | 10 |
| | | Vref2 | 2.5 | | R7 | 33 |
| | | | | | Σ | 183.9 |

In the case of the above-mentioned setting values, the temperature thresholds are set at −5° C., 0° C., 15° C., 45° C., 50° C., and 60° C. Thus, by dividing the charge temperature range into a plurality of regions, the charge mode can be switched depending on the region, and the charge voltage (the output voltage of the charger 4) can be switched, enabling to perform appropriate charging.

Figure 10:
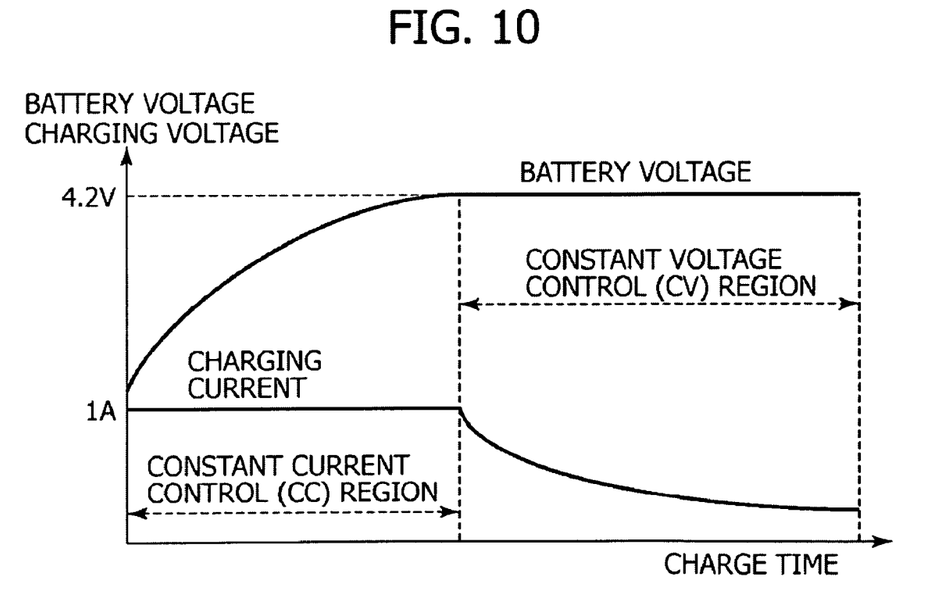
FIG. 10 is a graph showing charging characteristics of a lithium ion secondary battery.

Next, a sixth embodiment will be described. The sixth embodiment is suitably applicable to the charging of a lithium ion secondary battery. The lithium ion secondary battery is charged by characteristics as shown in FIG. 10.

As a charging method, a method of a combination of the constant-current charging and constant-voltage charging method is used. The lithium ion battery charging characteristics when charged by a charger having the constant-current and constant-voltage control characteristics of 4.2V and 1 A are shown in FIG. 10, on which the abscissa represents the charging current (A) and the ordinate represents the battery voltage (V). A period of time from the beginning of charging to a point the battery voltage reaches, for example, 4.2V is a constant current control period, and charging is carried out at a constant current (1 A). When the battery voltage reaches 4.2V, the constant voltage control is initiated to stop any further voltage rise, leading to the characteristics that the charging current is lowered as the charging is advanced. This period is a constant voltage control period.

At the point that the constant current control is changed to the constant voltage control, namely the point that the battery voltage reached 4.2V, the battery capacity has reached approximately 70% to 80% charge. It is known that, although the lithium ion secondary battery has a characteristic feature of a long cycle life, the battery heat generation during charging, particularly after reaching 4.2V greatly affects the cycle life deterioration. In consideration of this, the sixth embodiment is configured to perform the temperature management after the battery voltage reached 4.2V, namely in a constant voltage charging region. Since no temperature detection is carried out in the constant current charging region, the processing in the charge controller can be simplified, thereby suppressing occasions of the microcomputer program bug and the charge control failure.

Figure 11:
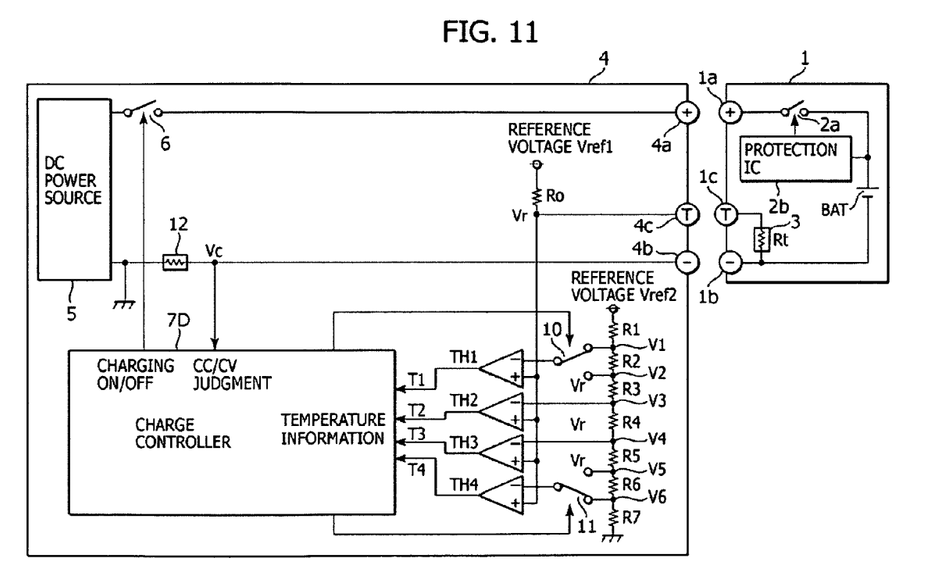
FIG. 11 is a block diagram of a sixth embodiment.

FIG. 11 shows the configuration of the sixth embodiment. This configuration is different from the configuration of the fifth embodiment (FIG. 8) in that, in order to distinguish the constant current charging and the constant voltage charging, a resistor 12 for detecting the charging current is interposed in the charging current path. A detection voltage Vi generated at the detection resistor 12 is supplied to a charge controller 7D to judge the present charge operation.

Figure 12:
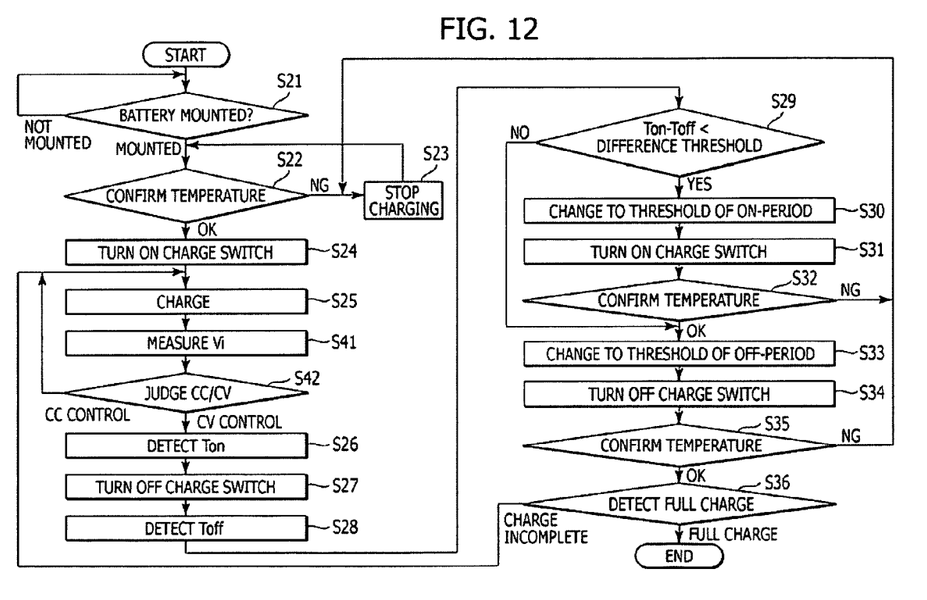
FIG. 12 is a flow chart showing a processing flow of the sixth embodiment.

The charge controller 7D detects temperature only in the constant voltage control period in the constant-current and constant-voltage control. FIG. 12 shows the flow chart of the processing flow of the sixth embodiment. The flow chart of FIG. 12 is different from the flow chart of FIG. 7 in adding step S41 to measure the detection voltage Vi and step S42 to distinguish the constant current charging and the constant voltage charging.

During the charge operation (step S25), the detection voltage Vi is measured (step S41), and based on the detection voltage Vi, it is judged whether the present state is the constant current charging (CC) or the constant voltage charging (CV). If the judgment result is the constant current charging (CC), the procedure returns to step S25 to resume the charge operation. If the judgment result is the constant voltage charging (CV), the procedure moves to step S26 (to detect the temperature Ton in the on-period). The succeeding processing is the same as that described with reference to FIG. 7.

The present application is not limited to the foregoing embodiments, and various modifications based on the technical idea of the present application are possible. For example, though the battery pack 1 is connected to the charger 4 in the above embodiments, the charger 4 may be configured within the main body of electronic equipment. The present application is also applicable to a nickel hydrogen battery other than the lithium ion secondary battery, and also applicable to the secondary battery alone, without limiting to the configuration in which the protection IC is integrated as in the battery pack.

According to the present application, it is possible to prevent charging under abnormal environmental temperature conditions, and also discontinue charging when any abnormal heat generation occurs during charging, thereby avoiding battery performance deterioration that might contribute to an accident. Further, since the battery temperature can be accurately detected, it becomes possible to surely continue charging until full charge in the charge temperature range, thereby preventing insufficient charging.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A charging apparatus comprising:
a temperature accepting portion that accepts temperature information corresponding to a temperature of a secondary battery or a battery pack,
a charging current supply portion that supplies a charging current to the secondary battery or the battery pack when the temperature is within a set charge temperature range,
a charging current interrupt portion that interrupts the charging current when the temperature is beyond the set charge temperature range;
wherein a charging current is turned on/off in a constant periodic cycle,
if a difference between a first temperature detected during the time the charging current is turned on and a second temperature detected during a time the charging current is turned off is not more than a threshold, it is judged whether each of the first temperature and the second temperature is within the charge temperature range, and
if the difference between the first temperature and the second temperature is greater than the threshold, it is judged whether the second temperature is within the charge temperature range.

2. The charging apparatus according to claim 1, wherein:
the charge temperature range is divided into a plurality of regions, and
it is judged which region of these divided regions the temperature belongs to.

3. The charging apparatus according to claim 1, wherein:
a charging current is turned on/off in a constant periodic cycle, and
it is judged whether at least a temperature detected during a time the charging current is turned off is within the charge temperature range.

4. The charging apparatus according to claim 1, wherein the charge temperature range is set independently with respect to the first and second temperatures.

5. The charging apparatus according to claim 1, wherein in charge control in which constant current charge operation and constant voltage charge operation performed are in the order indicated, it is judged whether the temperature is within the charge temperature range, only during the constant voltage charge operation.

6. A charging method comprising:
accepting temperature information corresponding to a temperature of a secondary battery or a battery pack;
supplying a charging current to the secondary battery or the battery pack when the temperature is within a set charge temperature range;
interrupting the charging current when the temperature is beyond the set charge temperature range;
wherein a charging current is turned on/off in a constant periodic cycle,
if a difference between a first temperature detected during a time the charging current is turned on and a second temperature detected during the time the charging current is turned off is not more than a threshold, it is judged whether each of the first temperature and the second temperature is within the charge temperature range, and
if the difference between the first temperature and the second temperature is greater than the threshold, it is judged whether the second temperature is within the charge temperature range.

7. The charging method according to claim 6, wherein:
the charge temperature range is divided into a plurality of regions, and
it is judged which region of these divided regions the temperature belongs to.

8. The charging method according to claim 6, wherein:
a charging current is turned on/off in a constant periodic cycle, and
it is judged whether at least a temperature detected during a time the charging current is turned off is within the charge temperature range.

9. The charging method according to claim 6, wherein the charge temperature range is set independently with respect to the first and second temperatures.

10. The charging method according to claim 6, wherein in charge control in which constant current charge operation and constant voltage charge operation are performed in the order indicated, it is judged whether the temperature is within the charge temperature range only when the constant voltage charge operation is performed.

\* \* \* \* \*